(12) United States Patent
Glidden et al.

(10) Patent No.: US 11,323,406 B2
(45) Date of Patent: May 3, 2022

(54) SYSTEM AND METHOD FOR IDENTIFYING AND RETRIEVING SIGNATURE CONTACT INFORMATION FROM AN EMAIL OR EMAIL THREAD

(71) Applicant: Introhive Services Inc., Fredericton (CA)

(72) Inventors: Jody Glidden, Miami Beach, FL (US); Paul Graham, Fredericton (CA); Carl Moeller, Harvey York County (CA); Ming Wong, New Maryland (CA)

(73) Assignee: Introhive Services Inc., Fredericton (CA)

( * ) Notice: Subject to any disclaimer, the term of this patent is extended or adjusted under 35 U.S.C. 154(b) by 0 days.

(21) Appl. No.: 16/907,998

(22) Filed: Jun. 22, 2020

(65) Prior Publication Data
US 2021/0029069 A1    Jan. 28, 2021

Related U.S. Application Data

(60) Provisional application No. 62/885,516, filed on Aug. 12, 2019, provisional application No. 62/879,091, filed on Jul. 26, 2019.

(51) Int. Cl.
*H04L 51/48* (2022.01)
*H04L 51/046* (2022.01)
(Continued)

(52) U.S. Cl.
CPC .......... *H04L 51/28* (2013.01); *G06F 40/295* (2020.01); *H04L 51/046* (2013.01); *H04L 51/14* (2013.01); *H04L 51/18* (2013.01); *G06Q 30/0281* (2013.01)

(58) Field of Classification Search
CPC ....... H04L 51/28; H04L 51/046; H04L 51/14; H04L 51/18; H04L 51/16; G06F 40/295; G06F 40/279; G06Q 30/0281
See application file for complete search history.

(56) References Cited

U.S. PATENT DOCUMENTS 8,311,874 B2   11/2012  Gupta et al.
9,633,057 B2   4/2017   Glidden
(Continued)

OTHER PUBLICATIONS

Eggert, A. et al. "Value creation in the relationship life cycle: A quasi-longitudinal analysis" Industrial Marketing Management. 35 2006.
(Continued)

*Primary Examiner* — Joe Chacko
(74) *Attorney, Agent, or Firm* — Ridout & Maybee LLP; David J. Greer

(57) ABSTRACT

An email message body is processed to identify groups of characters that match patterns from a set of predefined signature data patterns. For each identified group of characters, a respective block of the email message body is reviewed to identify other groups of characters within the respective block that also match patterns from the set of predefined signature data patterns. A block score is generated for the respective block based on the groups of characters identified as matching patterns from the set of predefined signature data patterns. One of the blocks is selected based on the block scores generated for the respective blocks, and signature contact information is retrieved from the selected block.

20 Claims, 8 Drawing Sheets

(51) Int. Cl.
*H04L 51/00* (2022.01)
*G06F 40/295* (2020.01)
*H04L 51/18* (2022.01)
*G06Q 30/02* (2012.01)

(56) References Cited

U.S. PATENT DOCUMENTS

| | | |
|---|---|---|
| 2002/0049626 A1 | 4/2002 | Mathias |
| 2005/0065980 A1 | 3/2005 | Hyatt |
| 2005/0125463 A1 | 6/2005 | Joshi et al. |
| 2005/0131762 A1 | 6/2005 | Bharat et al. |
| 2009/0313075 A1 | 12/2009 | O'Sullivan et al. |
| 2010/0121684 A1 | 5/2010 | Morio et al. |
| 2011/0161835 A1 | 6/2011 | Karam |
| 2011/0207484 A1* | 8/2011 | Karnam Holal ........ H04L 51/16 455/466 |
| 2011/0276356 A1 | 11/2011 | Smith |
| 2012/0095837 A1 | 4/2012 | Bharat |
| 2013/0218883 A1 | 8/2013 | McConnell et al. |
| 2014/0136613 A1 | 5/2014 | Chandar |
| 2015/0006297 A1 | 1/2015 | Stark |
| 2015/0205842 A1 | 7/2015 | Jain et al. |
| 2016/0232540 A1 | 8/2016 | Gao |
| 2016/0247163 A1 | 8/2016 | Donsky |
| 2016/0358065 A1 | 12/2016 | Gedge et al. |
| 2017/0372254 A1 | 12/2017 | Vainas et al. |
| 2018/0246886 A1 | 8/2018 | Dragomirescu |
| 2018/0293550 A1 | 10/2018 | Liang et al. |
| 2019/0074987 A1 | 3/2019 | Wiener et al. |
| 2019/0095507 A1 | 3/2019 | Elisseeff et al. |
| 2019/0140995 A1* | 5/2019 | Roller .................... G06F 40/56 |
| 2019/0251593 A1 | 8/2019 | Allouche |
| 2019/0324655 A1 | 10/2019 | Nguyen et al. |
| 2019/0361879 A1* | 11/2019 | Rogynskyy ............ G06F 16/22 |
| 2020/0065768 A1 | 2/2020 | Fuller |

OTHER PUBLICATIONS

Jap, S. et al. "Testing a Life-Cycle Theory of Cooperative Interorganizational Relationships: Movement Across Stages and Performance" Management Science. 53 2007.

Anonymous "Method and Apparatus to Perform Automated Data Migration Between Heterogeneous Data Sources" 2009.

* cited by examiner

700 Sample Muilti-thread Email received by SDR System

704

Good morning Mr. Bucket,

We have taken a review of our carpet painting system and we will not be upgrading the equipment this fiscal year.

We will keep your information on file as we will revisit this decision in the next fiscal year.

Thanks,
Jacob MacKay
Maintenance and Equipment Manager
902-555-6767 ext.2185
jmackay@home.com

702
On Wed, Aug 7, 2019 1:20PM Phil Bucket <pbucket@home.com> wrote:

706

Good afternoon,

I am following up on a conversation that I had with Chad Smith at the Widget conference. Chad identified that your organization may be interested in upgrading your carpet painting system.

I would like to be able to present a demonstration. Can you please phone me at 506-555-1212 to arrange a date and time?

I am certain that we can get you the upgrade that you are needing for a price within your budget, while still maintaining high quality.

Best Regards,
Phil A. Bucket
Regional Sales Manager
506-555-1212 ext.102
pbucket@home.com

*"The height of my goals will not hold me in awe, though I may stumble often before they are reached."*
*Og Mandino*

FIG. 7

SYSTEM AND METHOD FOR IDENTIFYING AND RETRIEVING SIGNATURE CONTACT INFORMATION FROM AN EMAIL OR EMAIL THREAD

REFERENCE TO CO-PENDING APPLICATIONS

This application claims the benefit of and priority to: (1) U.S. Provisional Patent Application No. 62/879,091, entitled "SYSTEM AND METHOD FOR IDENTIFYING AND RETRIEVING SIGNATURE CONTACT INFORMATION FROM AN EMAIL" filed Jul. 26, 2019; and (2) U.S. Provisional Patent Application No. 62/885,516 entitled "SYSTEM AND METHOD FOR IDENTIFYING AND RETRIEVING SIGNATURE CONTACT INFORMATION FROM AN EMAIL OR EMAIL THREAD", filed Aug. 12, 2019; the contents of which are is fully incorporated herein.

TECHNICAL FIELD

The present disclosure relates to method and systems for processing emails to extract signature contact information from an email.

BACKGROUND

Enterprises such as companies, accounting firms, law firms, universities, partnerships, agencies and governments commonly use Customer Relationship Management (hereinafter referred to as CRM) technology to manage relationships and interactions with other parties such as customers and potential customers. In particular, CRM systems typically employ electronic computing and communications devices that enable one or more of contact management, sales management and calendar management with the objective of enhancing productivity. An important function provided by CRM systems is digital tracking and storage of data about third parties such as customers and potential customers.

It is not uncommon for enterprises to have much of the communication with clients or potential clients in an electronic format and enterprises are constantly looking for faster, more efficient methods of identifying and entering more accurate contact data into their CRM.

A problem is that electronic communication such as, but not limited to, emails are often between two (or a few) individuals. This results in an individual involved in the email communication exchange having to explicitly identify and extract desired client data to be retained and stored.

This can result in inefficiencies as individuals are required to take time to enter the data into the enterprise CRM. This manual entering of data can also lead to data entry errors, greatly reducing the value to the enterprise of the information in the CRM (as the trust level in that data is reduced through omissions or the errors that have been manually introduced).

There are solutions that exist today that require the individual with the email having to manually identify (or flag) exactly in the email where the signature contact information is stored to allow a tool/system to extract this information. There are also solutions that exist today that will review a specific geographical location (i.e. the end of an email) to extract this information but there is no standard format for the body text of an email, making it harder to identify which portion of the email message contains the signature contact information. The format of an email varies by mail system and can also further vary by each user of the mail system.

Accordingly, there is a need for systems and methods that enable efficient and accurate extraction of client contact information from the body of an email to populate CRM systems.

The foregoing examples of the related art and limitations thereto are intended to be illustrative and not exclusive. Other limitations of the related art will become apparent to those of skill in the art upon a reading of the specification and a study of the drawing.

SUMMARY

According to a first example aspect an automated computer implemented method for retrieving signature contact information from email messages is disclosed. The method includes: processing an email message body to identify groups of characters that match patterns from a set of predefined signature data patterns. For each group of characters that is identified as matching one of the predefined signature data patterns, the method includes (a) reviewing a respective block of the email message body that includes up to a defined number of characters or words preceding the group of characters and up to a defined number of characters or words following the group of characters to identify other groups of characters within the respective block that also match patterns from the set of predefined signature data patterns, and (b) generating a block score for the respective block based on the groups of characters identified as matching patterns from the set of predefined signature data patterns, the method also includes selecting one of the blocks based on the block scores generated for the respective blocks, and retrieving signature contact information from the selected block and storing the retrieved signature contact information.

In some example embodiments, the set of predefined signature data patterns includes patterns corresponding to different types of signature data and generating the block score for the respective blocks is based on the types of the predefined signature data patterns identified within the respective block.

In some example embodiments, generating the block score for the respective blocks comprises reducing the block score if a threshold amount of predefined signature data patterns of a same type are identified within the respective block.

In some example embodiments, generating the block score for the respective blocks comprises increasing the block score if a threshold amount of different types of the predefined signature data patterns are identified within the respective block.

In some example embodiments, the types of the predefined signature data patterns include patterns corresponding to: name, title, email address, telephone number, and social media links.

In some example embodiments, processing the email message body to identify characters that indicate that the email message body includes fragments that each correspond to a respective email in a multi-email thread, wherein steps of selecting one of the blocks based on the block scores generated for the respective blocks, retrieving signature contact information from the selected block and storing the retrieved signature contact information, are performed for each of the fragments that correspond to a respective email.

In some example embodiments, the email message body is retrieved from an email in a batch of emails received from an email server, and the method is repeated for each of the emails in the batch.

In some example embodiments the method includes sending the retrieved signature contact information to a customer relationship management support system.

In some example embodiments the method includes, at the customer relationship management support system, determining if the retrieved signature contact information corresponds to a new contact or includes updated information for an existing contact and if so sending updated contact information based on the retrieved signature contact information to a customer relationship management system.

In some example embodiments, processing the email message body to identify groups of characters that match patterns from the set of predefined signature data patterns, reviewing the respective blocks to identify other groups of characters within the respective block that also match patterns from the set of predefined signature data patterns, generating the block scores, selecting one of the blocks, and retrieving signature contact information and storing the retrieved signature contact information, are all performed at a processing system that is within a client network together with a mail server from which an email message that includes the email message body is received. The customer relationship management support system and the customer relationship management system are each located outside of the client network.

According to a second example aspect a processing system for retrieving signature contact information from email messages is disclosed. The processing system includes: a processor; an interface operatively coupled to the processor for accessing email messages from a mail server; and a non-transitory storage operatively connected to the processor and storing executable instructions that when executed by the processor configure the processing system to: access a plurality of emails that have been received by the mail server and that are addressed to different users; for at least some of the plurality of emails: automatically process the email message body of the email to identify groups of characters that match patterns from a set of predefined signature data patterns. For each group of characters that is identified as matching one of the predefined signature data patterns, the processing system is configured to (a) review a respective block of the email message body that includes up to a defined number of characters or words preceding the group of characters and up to a defined number of characters or words following the group of characters to identify other groups of characters within the respective block that also match patterns from the set of predefined signature data patterns, and (b) generate a block score for the respective block based on the groups of characters identified as matching patterns from the set of predefined signature data patterns. The processing system is configured to select one of the blocks based on the block scores generated for the respective blocks, and retrieve signature contact information from the selected block and store the retrieved signature contact information.

BRIEF DESCRIPTION OF THE DRAWINGS

Exemplary embodiments are illustrated in the referenced figures of the drawings. It is intended that the embodiments and figures disclosed herein are to be considered illustrative rather than restrictive.

FIG. 7 is a sample email body displaying an email chain/thread and the complex pattern included in the email body to separate the two in accordance with an example embodiment of the present disclosure.

Similar reference numerals may have been used in different figures to denote similar components.

DESCRIPTION

Figure 1:
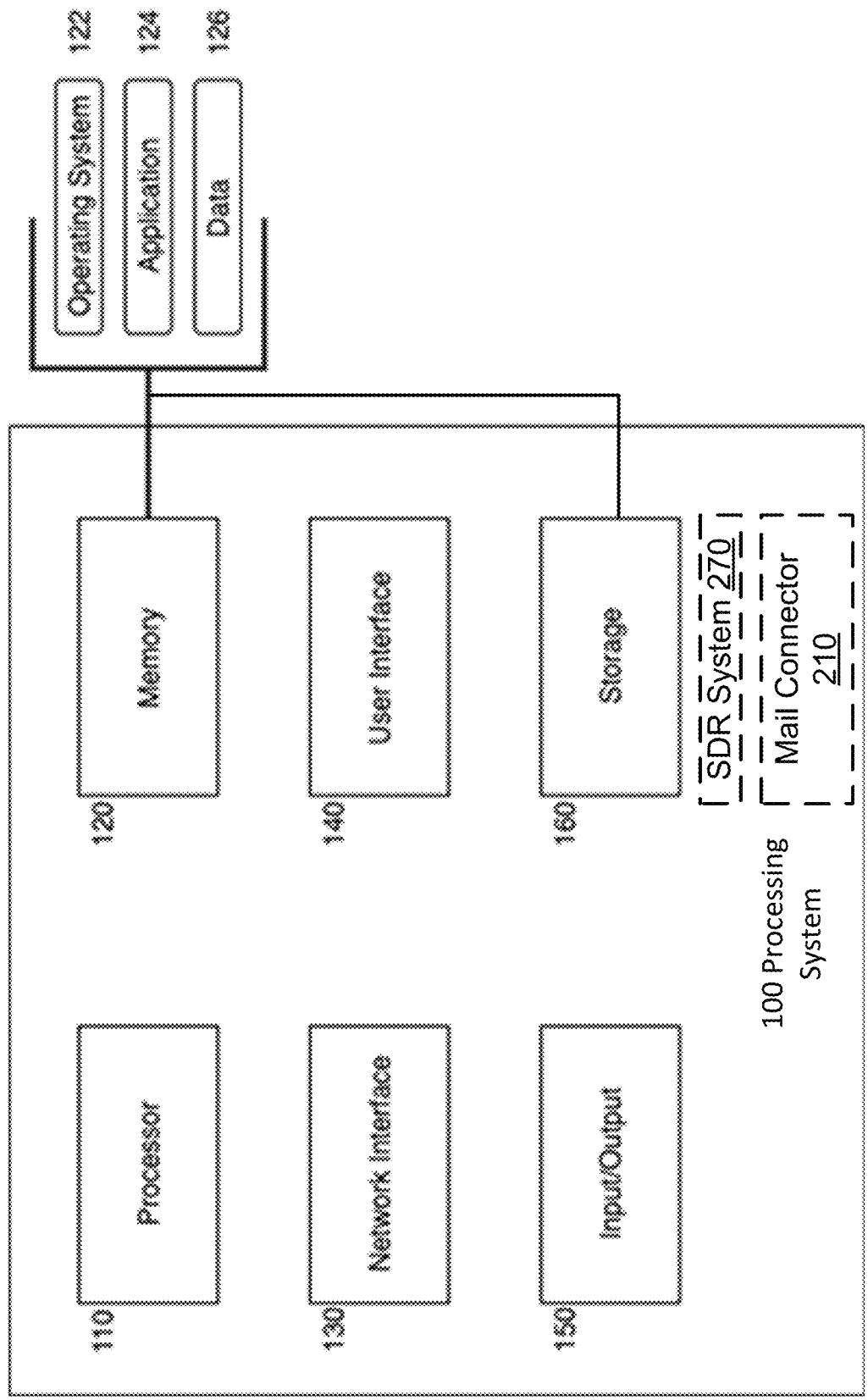
FIG. 1 illustrates an example system for implementing a processing system that can implement a signature contact information retrieval system in accordance with an example embodiment of the present disclosure.

The following embodiments and aspects thereof are described and illustrated in conjunction with systems, tools and methods which are meant to be exemplary and illustrative, not limiting in scope. In various embodiments, the above-described problem has been reduced or eliminated, while other embodiments are directed to other improvements.

Embodiments of the present invention will now be described more fully hereinafter with reference to the accompanying drawings, in which some, but not all, embodiments of the invention are shown. The invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise.

The disclosed embodiments may address one or more issues faced by existing contact capture systems. In example embodiments, the disclosed system filters through the body of an email, identifying patterns and then breaks out a block of text (or fragment of the email body) for further analysis/scoring. In at least some applications, such a system may facilitate accurate and consistent capturing of contact information that is included in emails that are received at a mail server and addressed to a plurality of recipients within an enterprise.

As described in greater detail below, in example embodiments blocks of text from an email body are reviewed by a processing system for patterns and, based on the type/frequency of a pattern within a block, it is assigned a weighted score. Once the processing system has completed reviewing and scoring all of the blocks in the email body, then the processing system determines which block is most likely to contain the signature contact information. The signature contact information is then automatically extracted from the highest scoring block and submitted for integration into a CRM database.

Example embodiments are also directed to mitigating the problem of email chains/threads/strings (referred to hereafter in this disclosure as email threads). In an email that is part of an email thread, the body of the received email will often include not only new message content, but also content from previously received email messages (e.g., a parent or original email message and prior replies to that original email message) that are part of the email thread. Thus, an email that is part of an email thread can include multiple sets of signature contact information. In example embodiments, an email that incorporates a thread of prior emails is processed by dethreading/unwinding the body content into discrete fragments that each correspond to a respective email in the email thread and applying block processing to the body content corresponding to each of the fragments. In example embodiments, the block processing may retrieve signature contact information for each discrete email message in an email thread, resulting in multiple sets of signature contact information that can be submitted for integration into a CRM database.

In some example embodiments, the disclosed system may enable a plurality of emails received by an enterprise to be automatically processed at a high rate, for example several per second, compared to some existing solutions that require an individual that receives an email to manually identify (or flag) a location within each email that would contain signature contact information.

The disclosed methods and system are intended to be illustrative and not exclusive. Other methods and systems will become apparent to those of skill in the art upon a reading of the specification and a study of the drawings.

A processing system and method for implementing signature contact information retrieval is disclosed in accordance with example embodiments. The processing system is configured to receive an email, determine where in a body of the email signature contact information is located and extract the signature contact information.

In various example embodiments, the processing system can be configured to perform signature contact information retrieval as: (a) a scheduled batch process, (b) a batch process that runs after the accumulation of a pre-defined amount of new email, or (c) a batch process that processes all emails stored on a Mail Server (e.g., as part of an initial installation and configuration of the SDR system). In some examples, the processing system may be configured to process emails as they are received. In some examples, combinations of one or more of the forgoing alternatives can be used to process email based on configurable conditions and thresholds.

In example embodiments, signature contact information can be automatically extracted from wherever it is located in the text of the body of an email, including different signature contact information in different locations of an email thread, without requiring manual human interaction.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1 illustrates an example of a processing system 100 that can be configured to implement an email signature information retrieval system and method in accordance with an example embodiment of the present disclosure. In example embodiments, the processing system 100 is a computer enabled system that may, for example, comprise one or more computing devices such as computer servers. In an example where the processing system 100 comprises a single device or server, the processing system 100 includes at least one processor 110 which controls the overall operation of the processing system 100. The processor 110 is coupled to a plurality of components via a communication bus not shown which provides a communication path between the components and the processor 110. The components of the processing system 100 may for example include a memory 120, which may be Random Access Memory (RAM) or Read Only Memory (ROM), non-transitory writable storage 160 which may be one or more of a magnetic hard drive, flash erasable programmable read only memory (EPROM) or other suitable form of storage, input/output interfaces 150 such as one or more serial data ports (e.g. Universal Serial Bus (USB) data port), user interface devices 140 (e.g., input devices such as a keyboard, a mouse, or a microphone, and output devices such as a display) and a network interface 130.

The network interface 130 may comprise any combination of a long-range wireless communication module, a short-range wireless communication module, or a wired communication module (e.g. Ethernet) to facilitate communication through a communication network.

Storage 160 stores software instructions and data 126 that when executed by processor 110 configure the processing system 100 to implement the signature contact information retrieval system and method as described in this disclosure. In example embodiments, the software instructions include multiple software programs and functions, including operating system software 122 and applications 124 that can be loaded into memory 120 and executed by the processor. The applications 124 include software instructions that configures processing system 100 to implement components of the signature contact information retrieval system, including a mail connector 210 and a signature data retrieval (SDR) system 270.

The processing system 100 is configured to store data 126 in one or more of memory 120, storage 160, and external database systems. That data 126 can include data for supporting operation of mail connector 210 and SCD system 270, including, among other things, signature contact information such as, but not limited to, names, emails, phone numbers, social media links (e.g. Facebook, Twitter) and job titles retrieved from email communications.

Figure 2:
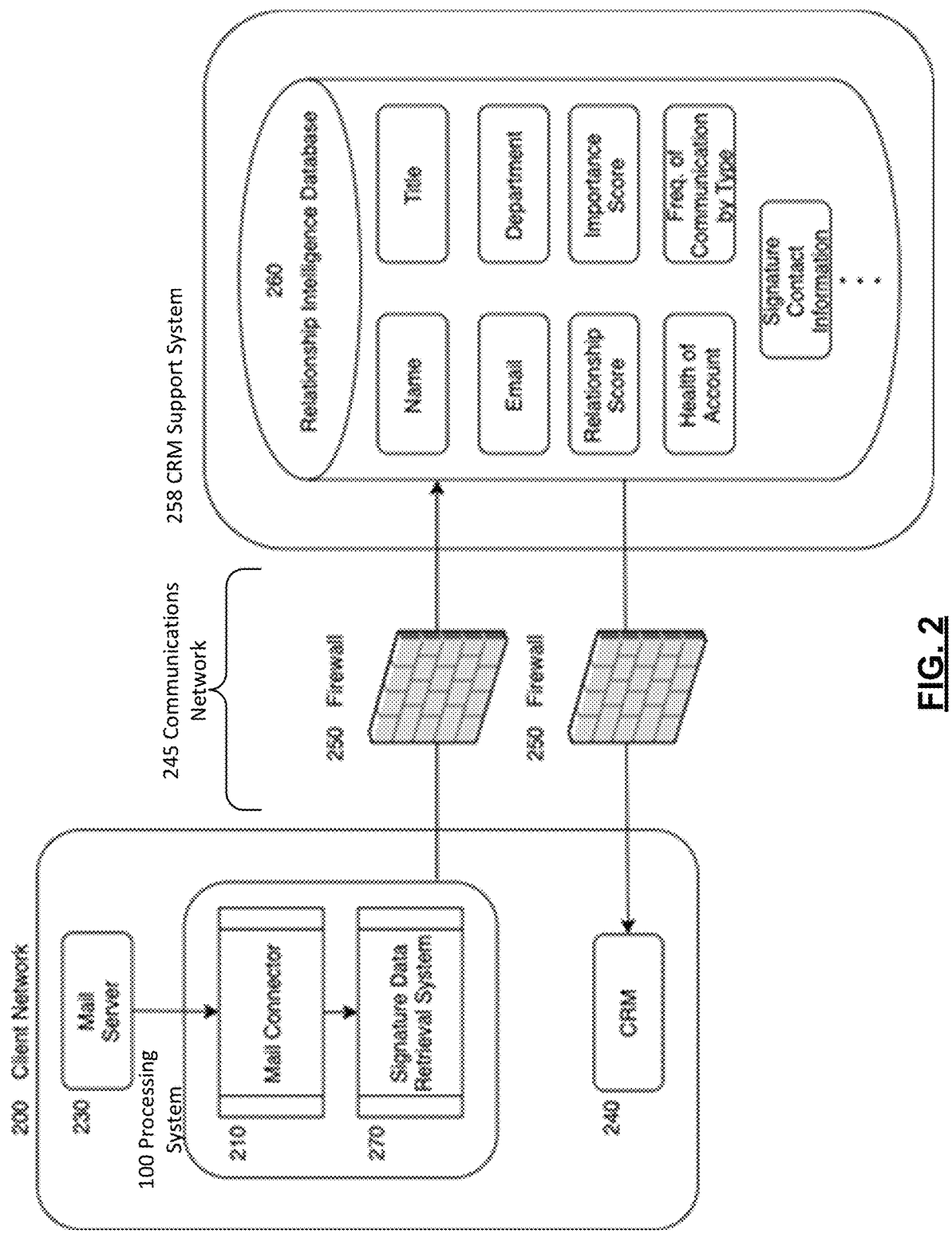
FIG. 2 illustrates a first example environment that incorporates the processing system of FIG. 1 in accordance with an example embodiment of the present disclosure.

FIG. 2 illustrates an example environment in which a processing system 100 that is configured to implement the mail connector 210 and SDR system 270 may operate according to example embodiments. In the example of FIG. 2, the processing system 100 is part of a client network 200 that supports an enterprise. By way of example, client network 200 may include a plurality of computing devices, servers and systems that are associated with an enterprise and are linked to each other through one or more internal or external communication networks, at least some of which may implement one or more virtual private networks (VPN). The environment of FIG. 2 also includes a CRM support system 258, which may in some examples be operated by a third party organization that is a service provider to the enterprise that is supported by client network 200. In an example embodiment, client network 200 and CRM support system 258 are connected through one or more communication networks 245. Communications network 245 may for example include the Intranet, one or more enterprise intranets, wireless wide area networks, wireless local area networks, wired networks and/or other digital data exchange networks. Intermediate firewalls 250 may be located between client network 200 and CRM system 258.

Among other devices and systems, client network 200 includes at least one mail server 230 for handling and delivering external email that client network 200 exchanges through communication network. Thus, mail server 230 contains emails sent/received by the enterprise associated with client network 200. In some examples, mail server 230 may also handle internal emails that are internal within client network 200.

The client network 200 includes processing system 100, which includes mail connector 210. Mail connector 210 is configured to connect to and retrieve emails from the mail server 230, thereby allowing the SDR system 270 to access emails. In example embodiments, the mail connector 210 may be hosted by the same processing system 100 (e.g., same server) as SDR system 270, and in some example embodiments the mail connector 210 may be hosted by a different processing system 100. In some examples, some or all of the functionality of mail connector 210 and SDR system 270 may be combined into a single application.

The SDR system 270 is configured to analyze emails that it receives from mail connector 210 to determine and extract signature contact information, as explained in detail further below.

The SDR system 270 is configured to connect to the CRM support system 258 via communications network 245 (through firewall 250) and send extracted signature contact information to the CRM support system 258 for processing and storage in a relationship intelligence database (RID) 260.

In example embodiments, client network 200 also hosts a CRM system 240. For example, CRM system 240 may be from a known CRM solution such as Salesforce.com™, Microsoft Dynamics™, InterAction™ and Maximizer™. In some examples, CRM support system 258 is configured to update CRM system 240 based on the signature contact information that the CRM system, 240 receives from processing system 100.

Figure 3A:
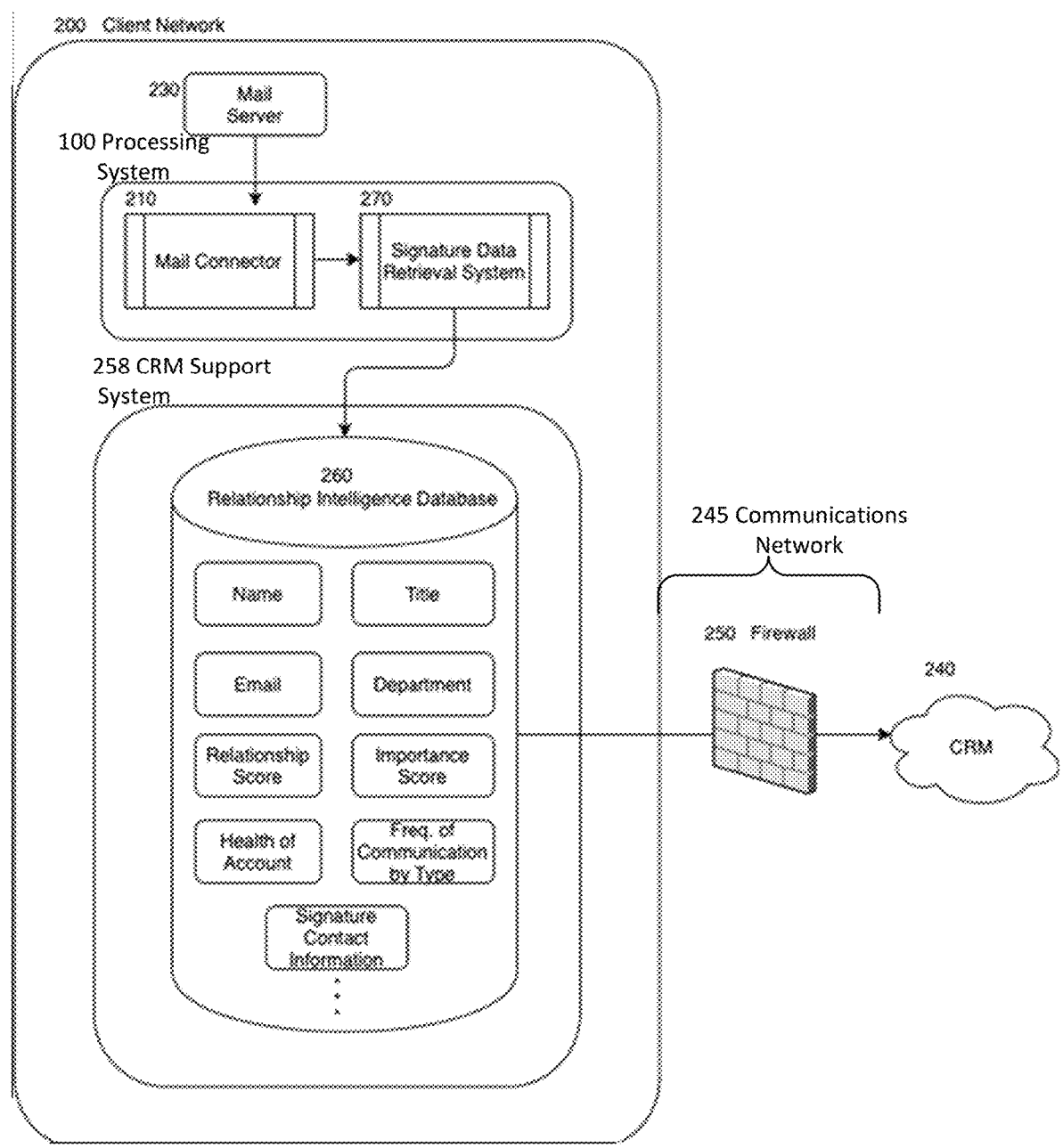
FIG. 3A illustrates a second example environment that incorporates the processing system of FIG. 1 in accordance with an example embodiment of the present disclosure.

FIG. 3A illustrates an alternate example environment in accordance with an example embodiment of the present disclosure. In the example of FIG. 3A, the CRM support system 258 is installed on the client network 200 residing on the client side of firewall 250 together with the client's mail server 230 and the processing system 100. However, in the embodiment of FIG. 3A, the CRM system 240 is located outside the client network 200 (e.g., in the cloud) on the other side of firewall 250. The processing system, 100 connects to the CRM support system 258 within the client network 200 allowing the CRM support system 258 to access the signature contact information directly within the client network 200. The CRM support system 258 is configured to send signature contact information to the CRM system 240 through the firewall 250 if an update is required.

Figure 3B:
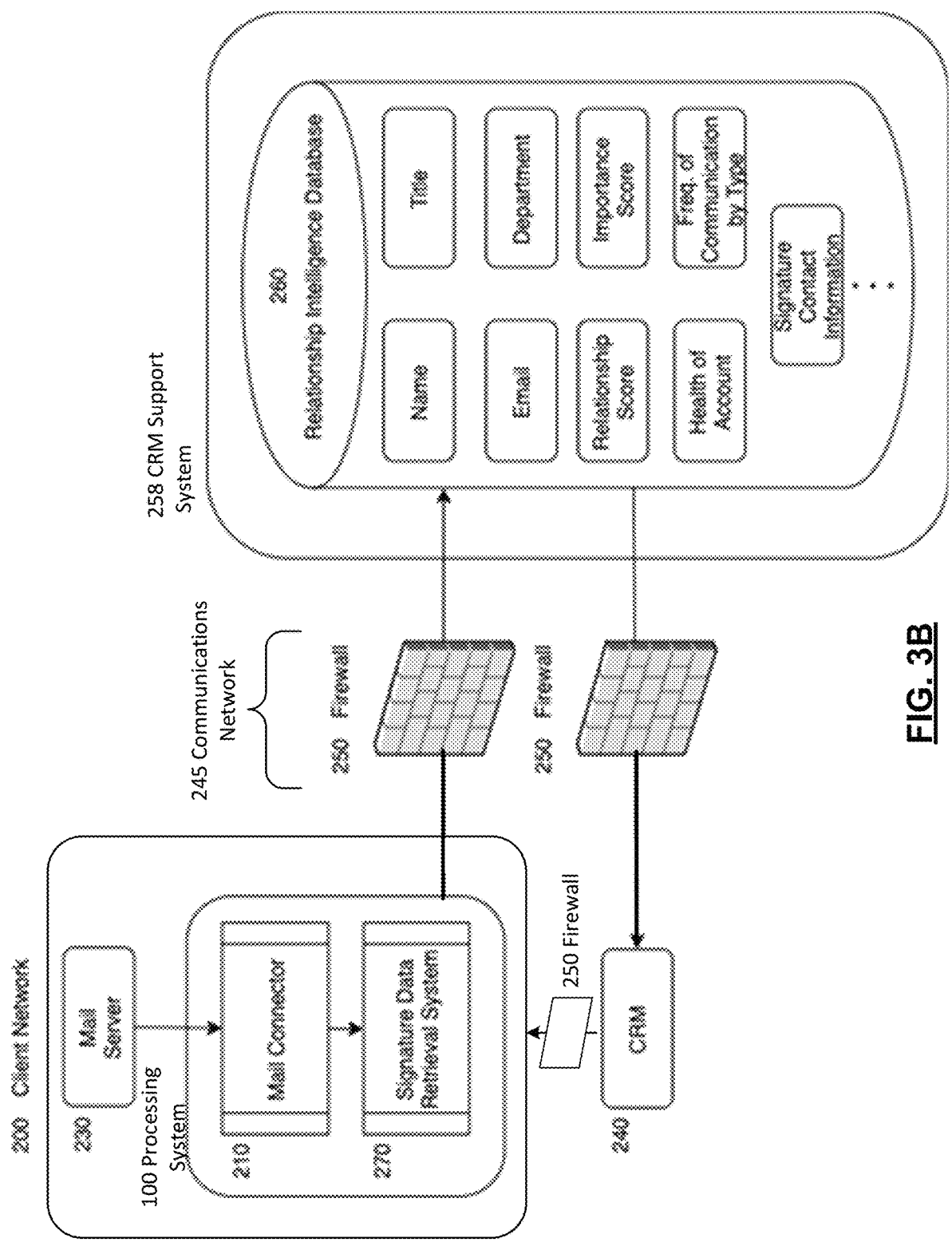
FIG. 3B illustrates a third example environment that incorporates the processing system of FIG. 1 in accordance with an example embodiment of the present disclosure.

FIG. 3B illustrates a further alternate example environment in accordance with an example embodiment of the present disclosure. In the example of FIG. 3B, the CRM support system 258 and CRM system 240 are both hosted at respective locations that are outside of the client network 200. Mail server 230 and processing system 100 are located within the client network 200.

FIG. 2 and FIGS. 3A, 3B are intended to illustrate that the SDR system 270 disclosed herein can function: residing on the client network 200, behind the client firewall 250 with a locally installed CRM system 240 and a remote cloud-based CRM support system, 258 (e.g, FIG. 2); residing on the client network 200 behind the client firewall 250 with a locally installed CRM support system 258 and a remote cloud-based CRM 240 (e.g., FIG. 3A); or residing on the client network 200 behind the client firewall 250 with both the CRM support system 258 and the CRM system 240 being remote cloud-based systems (e.g., FIG. 3B). These different configurations allow a solution to be tailored to each enterprise's security and privacy concerns.

Figure 4:
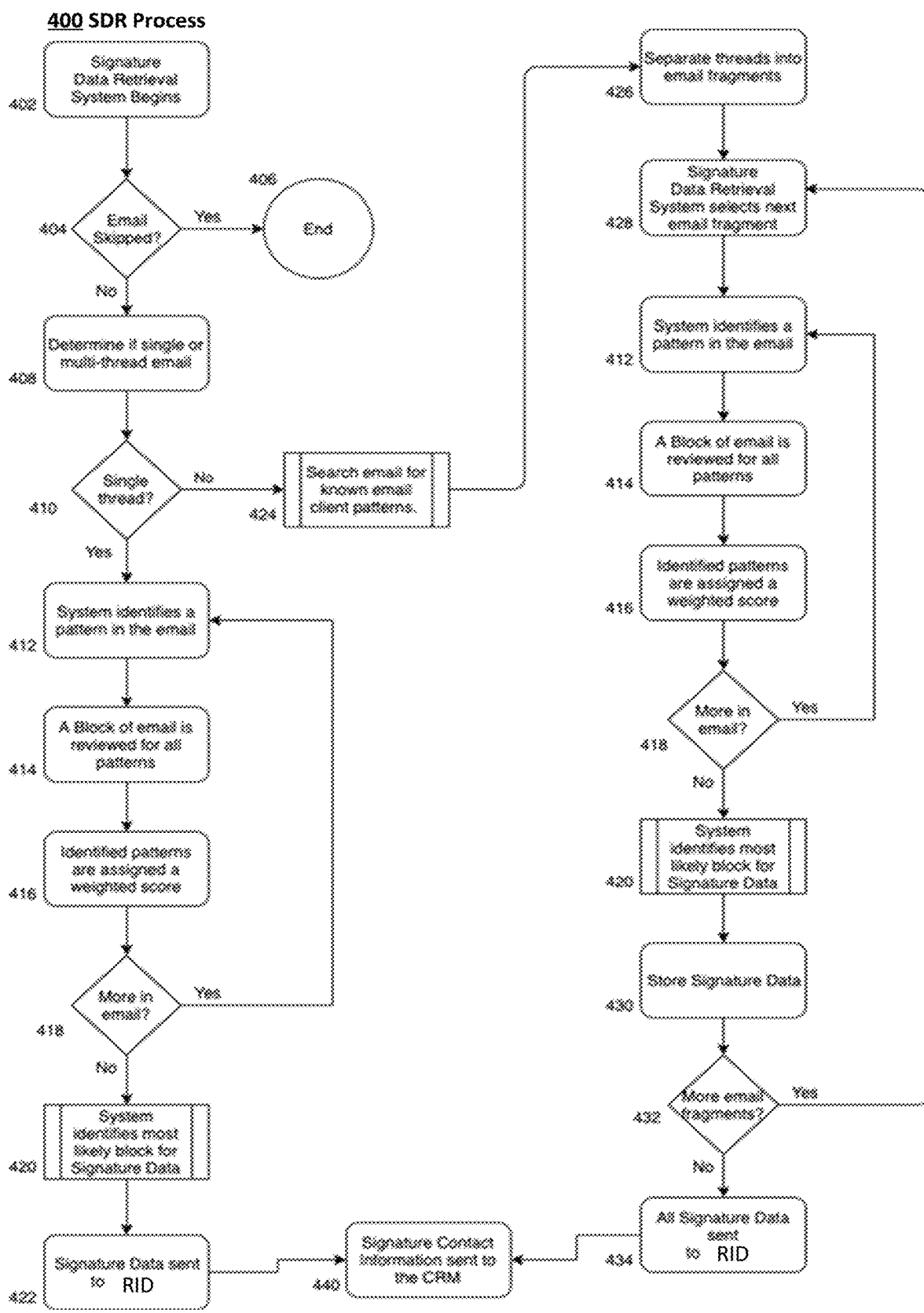
FIG. 4 is a flow chart of actions of a signature contact information retrieval process performed in the environments of any one of FIGS. 2, 3A and 3B, according to example embodiments.

FIG. 4 is a flow chart of actions corresponding to a process 400 performed by a processing system 100 of FIG. 1 configured to implement mail connector 210 and SDR system 270 according to example embodiments.

Referring to step 402, in example embodiments, mail connector 210 is configured to intermittently run a batch process to retrieve email messages from the mail server 230 for signature data retrieval by SDR system 270. In some examples, the mail connector 210 runs the batch process at scheduled times, for example every day at a set time (for example 2 AM local time of the mail server 230). In some examples the mail connector 210 may run the batch process when a threshold amount of email has accumulated since the last batch process was run. In some examples, the mail connector 210 may run the batch process when instructed to do so by a system administrator, for example upon an initial initialization and configuration. In some examples, email connector 210 may operate in a non-batch mode and receive and process emails as they are received by mail server 230.

With reference to step 404, in example embodiments, the mail connector 210 is configured to filter email that is available from the mail server 230 so that only selected emails stored at the mail server 230 are provided to the SDR system 270. As indicated above, a first layer of filtering is based on the type of batch retrieval that is performed, e.g., time based filtering (e.g. retrieve email received by mail server 230 since last batch process performed or other defined historical time period) or volume based filtering (e.g. retrieve emails from mail server 230 when a threshold number of emails have been received by the mail server 230 since last batch process performed). In some examples, combinations of time based and volume based filtering can be performed.

In example embodiments, a further layer of filtering can be performed by the mail connector 210 based on recipient email addresses or recipient mailbox. In example embodiments, mail connector 210 is provided with one or both of a blacklist and a whitelist of recipient email addresses. In some example scenarios where mail connector 210 is provided with a blacklist, the mail connector 210 does not retrieve emails from the mail server 230 that include recipient addresses that are included on the blacklist. In some example scenarios where mail connector 210 is provided with a whitelist, the mail connector 210 retrieves only emails that are addressed to addresses that are included on the whitelist. In some example scenarios where mail connector 210 is provided with both a whitelist and a blacklist, the mail connector 210 retrieves emails that are addressed to addresses that are included exclusively on the whitelist, excluding any addresses that are on the blacklist. In example embodiments, address-based filtering can be done at the domain level, at the username level, based on the full username@domain address, or combinations of the forgoing. Similar email address-based filtering can also be performed based on the sender's email address. In examples where mail server 230 handles internal email as well as external email, sender and recipient email address-based filtering may be performed to filter out internal emails that are unlikely to include any useful signature contact data. For example, if the sender email address and recipient email address(es) all have the same domain then an email can be classed as an internal email and skipped.

A further layer of filtering may be based on policies that can be set by an administrator. For example, policy based filtering may be applied based on one or more of subject field content (e.g., skip emails with blank subject line), email body content (e.g., skip emails that have empty body), and attachment type.

Accordingly, in example embodiments at step 404 the mail connector 210 performs one or more levels of filtering that determine if an email will be processed by SDR system 270 or skipped. As indicated in Step 406, the filtered/skipped emails are not passed to SDR system 270 and process 400 ends in respect of such emails.

Figure 5:
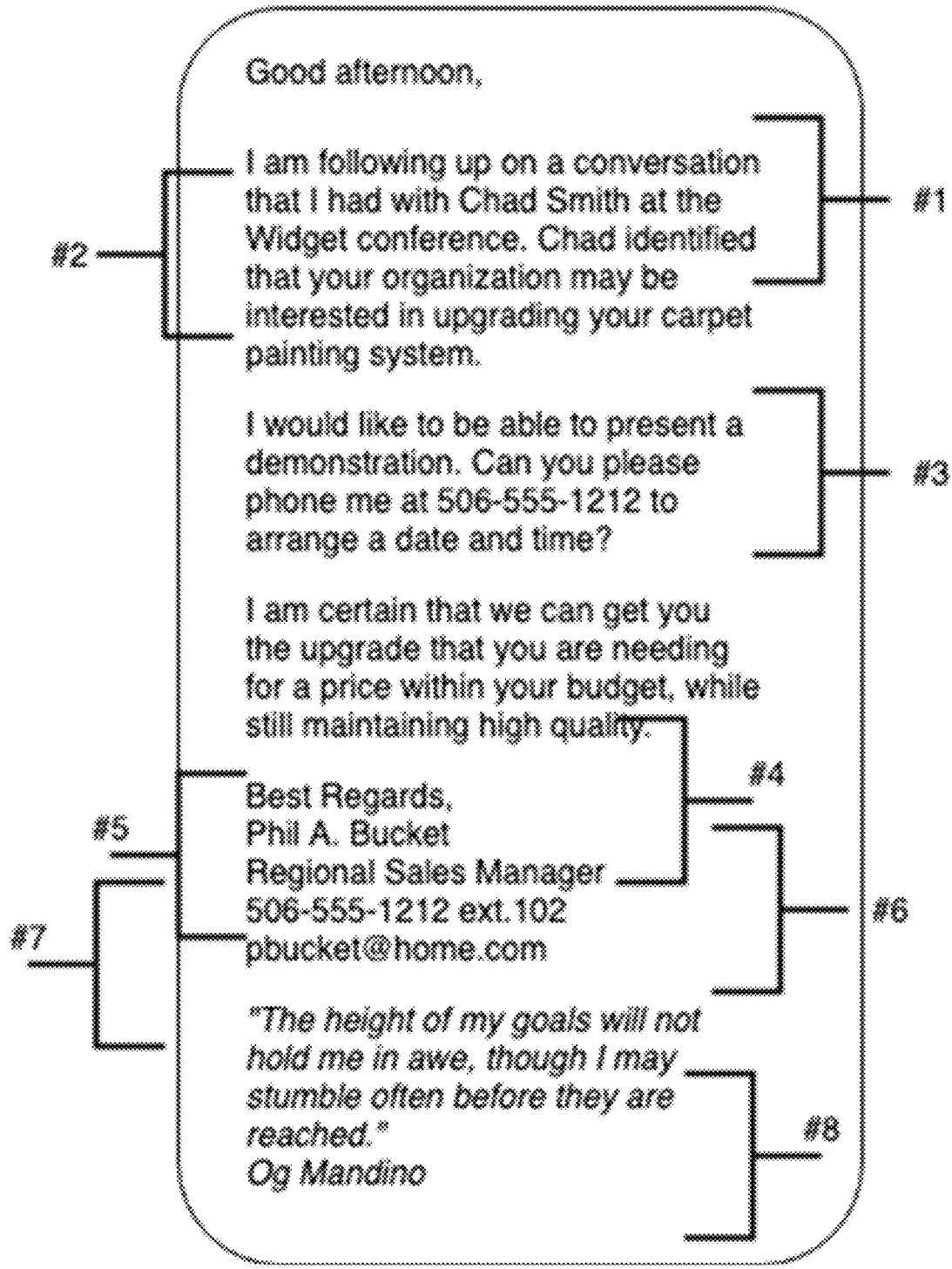
FIG. 5 is a sample email body with signature contact information.

In example embodiments, the email that are passed to the SDR system 270 by mail connector 210 have been stripped of attachments but include the email header and body and associated metadata. In this regard, FIG. 5 shows an example of an email body 500 of an email passed to SDR system 270 for processing. Processing of an email by SDR system 270 will now be described in detail commencing with step 408 in FIG. 4.

As indicted at step 408, SDR system 270 is configured to determine the email contains a single thread email (e.g., the email body includes only new content from the sending party) or if the email part of an email thread containing multiple email pieces or fragments (e.g. the email body also includes content from earlier reply emails or forwarded emails). In example embodiments, the SDR system 270 determines if an email is a single thread email or is a multi-email thread by searching the email body for known complex patterns used by email clients or servers to break/separate discrete emails within an email thread. Examples of these complex patterns includes, but are not limited to: (1) the characters ">" and ">>" appearing for each line (e.g., at initial characters for multiple successive lines) of an embedded email reply, and (2) phrases that match text patterns that are typically located at the start of a reply or forwarding pattern such as: (a) "On <date, time> <name> <email address> wrote:"(e.g., 'On Wed. Aug. 7, 2019 1:29 PM Phil Bucket <pbucket@home.com> wrote:'), (b) '-------- Forwarded message ------', or (c) 'Get Outlook for iOS' followed by _____ on the next line. In some examples, instead of or in addition to searching the email body for a pattern indicating the email is part of an email thread, the SDR system 270 is configured to determine if an email is part of an email thread by reviewing the subject line of the email for common patterns inserted by various email systems such as, but not limited to, "RE:", "Re:", "FWD:", "Fwd:" or "Fw:".

As indicated in step 410, if the SDR system 270 determines that the email is not a single thread email and is part of a multi-email thread, it performs an multi-email thread SDR process as represented by steps 424 to 434, otherwise the SDR system 270 will perform a single thread email SDR process as represented by steps 412 to 422.

An example of a single thread email SDR process as represented by steps 412 to 422 in FIG. 4 will now be described with reference to the email body 500 of FIG. 5, and the flow chart of FIG. 6. It will be noted that the email body 500 does not contain any patterns that would cause it to be classified as part of multi-email thread, thus it is classified in step 410 as being a single thread email.

As indicated at Step 412, SDR system 270 begins reviewing the email for signature data patterns. These patterns may be based on, but not limited to, Name, Email Address, Name, Title, Website, Address, Phone Number, Facebook URL, LinkedIn URL, Twitter URL, security statement, privacy statement or cultural layout considerations. Cultural layout considerations would allow the system to recognize signature patterns from different countries and additional languages beyond English.

Table 1 below indicates a non-limiting example set of signature patterns according to an illustrative embodiment, and weights assigned to a match for each of the patterns.

TABLE 1

Pattern Types and Scoring

| Pattern Type | Score |
| --- | --- |
| (1) Name (Bob, Judy, etc.) (Adams, Burns, etc.) | 1 |
| (2) Title (President, CEO, Partner etc.) | 2 |
| (3) Email Address (*@.*) | 2 |
| (4) Phone Number (nnn-nnn-nnnn, etc.) | 2 |
| (5) LinkedIn (www.linkedin.com/in/****) | 3 |
| (6) Facebook (facebook.com/*****) | 3 |
| (7) Twitter (twitter.com/****) | 3 |
| (8) Other URL (www.**.*) | 1 |

In example embodiments, SDR system 270 has access to respective datasets of signature data patterns for each of the above pattern types. In some examples, the pattern datasets may be stored locally in storage 160 of the processing system 100. In some examples, at least some of the pattern datasets may be stored remotely. When processing an email message body to identify groups of characters that match patterns from a set of predefined signature data patterns, SDR system 270 can, for example, for pattern type "Name", compare discrete words (e.g. a group of successive text characters that are preceded and followed by a space or punctuation character) or terms within the email message body against a dataset of first names and a dataset of last names to identify words that match a probable first name or a probable last name. Similarly, for pattern type "Title", the SDR system 270 can compare sets of characters within the email message body against a dataset of corporate titles to identify words or acronyms that match a probable title. Some of the pattern datasets may include character patterns rather than exact characters, for example patterns in the set representing patterns for different possible phone number configurations (e.g. nnn-nnn-nnnn; nnn.nnn.nnnn; nnnnnnnnnn, where "n" represents any numeric digit). In some examples, the datasets for the signature data pattern types may be customizable and updatable and may be selected based on geographic location.

As indicated in step 414, when a set or group of characters in the email body matching a pattern for a pattern type is identified, the SDR system 270 will block out a section of the email surrounding the group of characters that match the pattern. This block may be, for example, based on a certain number of characters or words before and after the identified pattern. For example, in email message body 500, the first occurrence in the text of the character set "Chad" has been identified as matching a name-type pattern, and accordingly, a block is identified by the SDR system 270 that includes a pre-defined number of words or characters preceding and following the identified pattern. This block is identified in FIGS. 5 and 6 as "#1", which may for example include a defined number of (e.g., 35) characters (or in some examples, a defined number of words) preceding and following the group of characters that are the identified pattern "Chad".

In an alternative example, in the case of single thread emails, the searchable name-type pattern and email address-type pattern could be limited such that the SDR system 270 reviews the email body for patterns that match the name and email of the sender of the email only, to determine the block of the email to analyze. A possible reason for this approach is, but not limited to, to speed the processing of emails. There would be fewer blocks of email identified in this manner.

As indicated in step 414, the selected block around the identified pattern is then searched to identify further matches within the block to patterns from the datasets of patterns. For example, in the case of text block #1, the SDR system 270 will identify name-type pattern "Smith" and a further occurrence of "Chad" as falling within text block #1.

As indicated at step 416, the SDR system 270 assigns a weighted score to each recognized pattern to come up with a score for the block. This score may be a positive or negative score and may be adjusted further (in a positive or negative manner) based on the frequency of that pattern within the block.

Accordingly, as per steps 412, 414 and 416, the SDR system 270 will identify a pattern in the body of the email and select a block of the email by selecting a pre-determined number of words (or characters, depending on configuration) before and after the identified pattern. The total block is then assigned a score based on, but not limited to, the recognized patterns within that block. A score multiplier is applied for scenarios such as, but not limited to, the number of different patterns identified and the number of each identified pattern in the block. The multiplier would be an increased multiplier for each pattern type beyond the first pattern. The multiplier would be a decreased multiplier for more frequent instances of the same pattern.

An example of an increased multiplier would be if the block was determined to contain three different pattern types (one name, one phone number and one email). This resulting increase in assigned score indicates that there is a higher chance that this is the location of the email that would contain the signature contact information due to the content of the block.

An example of a decreased multiplier would be if the block was determined to contain multiple entries of a single pattern type (e.g., three email addresses). This resulting decrease in assigned score indicates that there is a lower chance that this is the location of the email that would contain the signature contact information. In this particular example, a list of email addresses might be in the body of the email and would have a lower likelihood of being the location of the email that would contain the signature contact information.

By way of example, Table 1 above illustrates a score that could be applied for identified patterns within a block. Tables 2 and 3 below provide non-limiting examples of score multipliers (a value the score is multiplied by) and modifiers (a value added to or subtracted from the score) that could be applied in example embodiments.

In example embodiments, additional pattern types and respective pattern sets can be included other than or in addition to those shown in Table 1. For example, a Corporate name pattern type could be included that references a dataset of corporate names. Similarly, a zip code/postal code pattern type and street address pattern type could be included.

TABLE 2

Pattern Type Multipliers/Modifiers

| Pattern Type | Threshold Limit | Multiplier | Modifier |
|---|---|---|---|
| (1) Name | More than 2 | 0.5 | −2 |
| (2) Title | More than 2 | 0.75 | −1 |
| (3) Email Address | More than 2 | 0.5 | −1 |
| (4) Phone Number | More than 3 | 0.5 | −2 |
| (5) LinkedIn (www.linkedin.com/in/****) | More than 1 | 0.5 | −1 |
| (6) Facebook (facebook.com/*****) | More than 1 | 0.5 | −1 |
| (7) Twitter (twitter.com/****) | More than 1 | 0.5 | −1 |
| (8) Other URL (www.**.*) | More than 2 | 0.5 | −1 |

TABLE 3

Volume Based Multipliers/Modifiers

| Unique # of Pattern Types | Multiplier | Modifier |
|---|---|---|
| 2 | 1.25 | +1 |
| 3 | 2 | +2 |
| 4+ | 3 | +3 |

As illustrated in Table 2 and Table 3, in example embodiments, a modifier could be applied to the base weight/score for a block of email. Table 2 indicates examples of multipliers and modifiers that can be applied based on identifying multiple instances of a pattern type within the block. As illustrated in Table 2, there is a threshold limit for occurrences of a specific pattern type within that block. Once that threshold was exceeded, and the table in Table 2 identifies that the threshold can be different for each pattern type, there would be an adjustment applied that would reduce the score, based on the assumption that multiple types of the same pattern type is likely to indicate a list rather than signature data. Table 2 illustrates two of many possible adjustment approaches, one being a multiplicative reduction the other being a pure subtractive reduction of the score. In example embodiments, the adjustment could be based on the combination of raw block score with one of a multiplier and a modifier (e.g., final block score=raw block score*multiplier, or final block score=raw block score+modifier), or a combination of the raw block score with both a multiplier and a modifier (e.g., final block score=raw block score*multiplier+modifier).

Table 3 provides another example of multiplier and modifier adjustments that could be applied to a block score. The adjustment values in Table 3 are based on identifying a number of different pattern types within a block. As illustrated in Table 3, there would be an increasing multiplier and modifier for increasing numbers of unique pattern types, based on the assumption that the email block containing signature contact information is more likely to have multiple different pattern types. Table 3 shows two of many possible score adjustment approaches, one being a multiplicative increase the other being a pure additive increase of the weight/score.

Tables 2 and 3 are intended to be illustrative examples of score adjustments that may be applied to enhance the accuracy of the present embodiment. Other examples of score adjustments may be combined to create alternative embodiments not explicitly described. In some examples, the score adjustments can be user configurable, and in some examples different score adjustments may be applied based on one or more of the geographic regions the SDR system 270 is installed at, if available, a geographic source of the incoming email. For example, the Table 2 threshold limit for names may be rasied to three for emails associated with regions where individuals commonly use three names (e.g., Spanish speaking regions) as opposed to regions where individuals commonly use only two names (e.g, English speaking regions).

In some examples, the adjustments in Tables 2 and 3 can be combined in various combinations, for example:

$$\text{final block score} = \text{table 1 raw block score} * (\text{table 2 multiplier} + \text{table 3 multiplier}) + \text{table 2 modifier} + \text{table 3 modifier} \quad \text{(Equation 1)}.$$

Accordingly, in the example of email message block #1, the raw, pre-adjusted score may be 3 (e.g., 1 for first occurrence of name "Chad", 1 for occurrence of name "Smith", and 1 for occurrence of name "Chad" within block #1) referring to Table 2, the number of identified patterns of the name-type is 3, which is greater than the threshold of 2, such that the adjusted block score for block #1, using Equation 1: final block score=table 1 raw block score*(table 2 multiplier+table 3 multiplier)+table 2 modifier+table 3 modifier, is applied as follows: final block score (block #1)=3*(0.5+0)+(−2)+(0)=−0.5.

As indicated in Step 418, SDR system 270 is configured to determine if there is more content to the email body that has not been reviewed for patterns. If there is, the SDR system 270 will return to step 412 and identify the next block. If the block just scored was the last block from the email, then the SDR system 270 proceeds to step 420. As illustrated in FIGS. 5 and 6, the presently described embodiment permits the same text within an email to appear in more than one block. The SDR system, 270 begins reviewing for the next pattern occurrence just after the last pattern identified. If that next pattern is identified only a few words or a sentence further in the email, then the new block selected could include text from the previous block. See FIGS. 5 and 6 for an example of this wording overlap.

Figure 6:
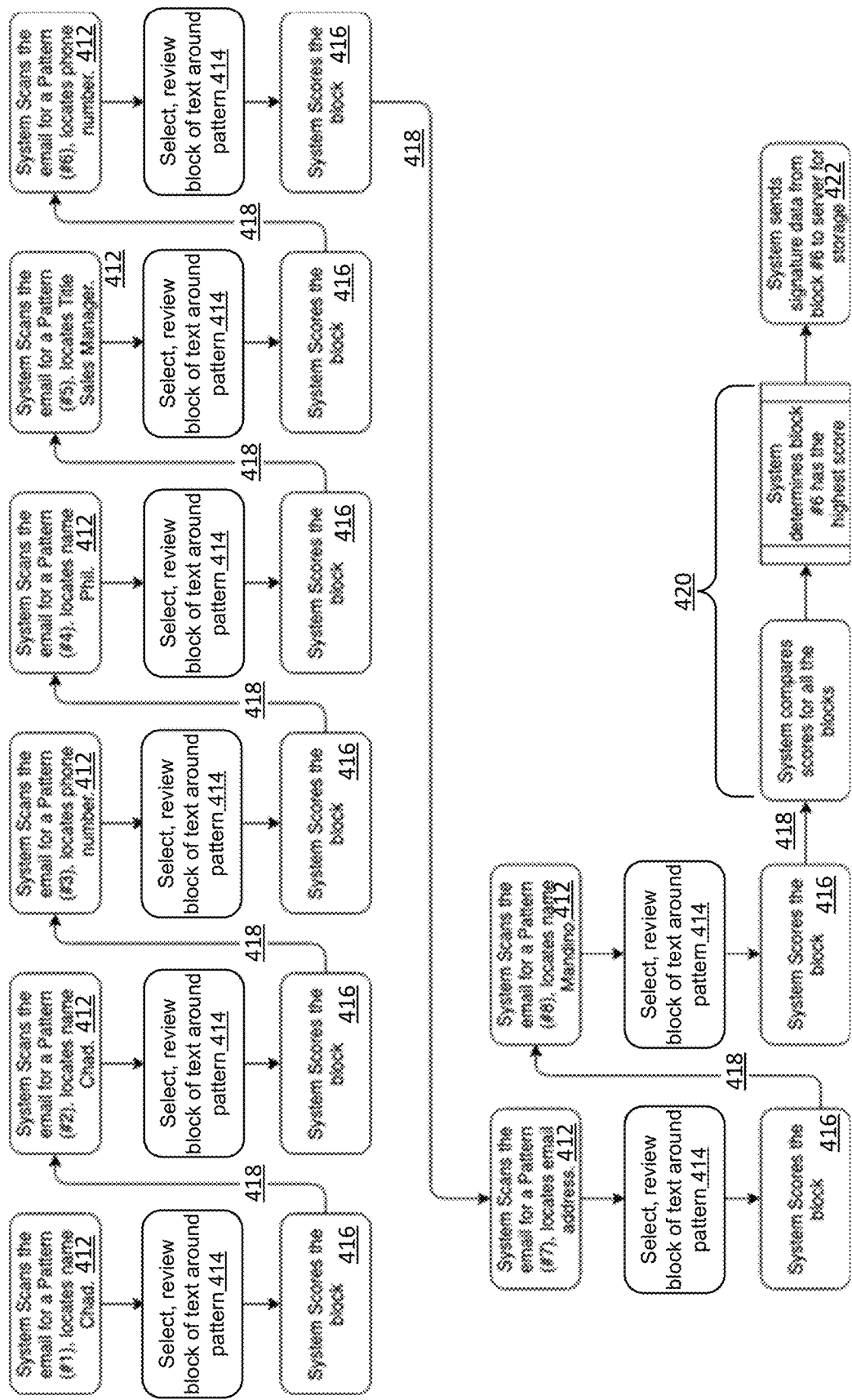
FIG. 6 describes an example flow of the signature contact information retrieval process performed in respect of the sample email from FIG. 5 in accordance with an example embodiment of the present disclosure.

Thus, as illustrated in FIG. 6, SDR system 270 is configured to repeat steps 412 to 416 until all blocks that include a set of characters that match a pattern from one of the pattern types have been identified and the blocks have been scored. In the illustrated example, blocks for the last name in a first name/last name combination are omitted from the scoring process (e.g. "Smith" in "Chad Smith"). Thus, for email body 500, block #2 is centered around the second occurrence of name-type pattern "Chad", and block #2 is also allocated a final block score of −0.5 using equation 1.

Block #3 is centered around phone number pattern type "506-555-1212", and is allocated a final block score of 2 using equation 1.

Block #4 is centered around name pattern "Phil", and the block also includes name pattern "Bucket" and title pattern "Regional Sales manager", generating a raw block score of 4 and an adjusted final block score of 6.

Block #5 is centered around title pattern "Regional Sales manager", and the block also includes name pattern "Phil", name pattern "Bucket" and phone number pattern "506-555-1212", generating a raw block score of 6, and an adjusted final block score of 14.

Block #6 is centered around phone number pattern "506-555-1212", and the block also includes first name pattern type "Phil", last name pattern "Bucket", title pattern "Regional Sales manager", and email pattern "pbucket@home.com", generating a raw block score of 8, and an adjusted final block score of 27.

Block #7 is centered around email pattern "pbucket@home.com", and the block also includes phone number pattern "506-555-1212" and title pattern "Regional Sales manager", generating a raw block score of 6, and an adjusted final block score of 14.

Block #8 is centered around name pattern "Og", and the block also includes name pattern "Mandino", generating a raw block score of 2, and a final block score of 2.

As indicated at step 420, once the entire email body has been processed and all blocks identified and scored, SDR system 270 reviews the score for each block and determines which block is most likely to be the block that contains the signature contact information (with that selected block being the block with the highest score). In some examples, the comparison of step 420 could be made each time block score is calculated in step 416, such that SDR system 270 compares the block scores after each block is reviewed/scored and just keeps the signature data from the highest scoring block through each iteration of steps 412 to 416. This alternate implementation would result in an overall global comparison of step 420 being skipped.

In the illustrated example of FIGS. 5 and 6, Block #6 has the highest final block score and is thus selected by the SDR system 270 as a signature block for the email.

In some example embodiments, a minimum threshold score may be required, and if no block exceeds the threshold then a determination is made that the email message body contained no signature data for retrieval and the SDR process 400 ends in respect of that email. In some examples embodiments, in the event of a tie in the final block score between two blocks, a tie breaking rule may be applied, for example, SDR system 270 may be configured to deem that the last block occurring in the email body has the highest score in the event of a tie between two or more blocks.

As indicated in step 422, SDR system 270 is configured to retrieve the signature contact information from the email content block selected in step 420 and then store that signature contact information (e.g., store in storage 160). In example embodiments, the signature contact information is stored with metadata that identifies the email that the information has been extracted from. The signature contact information that is retrieved could be based on the pattern types of Table 1 and could include, but is not limited to, Email Address, Name, Title, Company Website, Business Phone number, Mobile Phone number, Home Phone number, Other Phone number, Facebook URL, LinkedIn URL or Twitter URL. In the case of email message 500, the following signature contact information is retrieved from block #6: Name: Phil A. Bucket; Title: Regional Sales Manager; Phone number: 506-555-1212 ext. 102; and email address: pbucket@home.com. In some examples different (e.g. additional or fewer) signature data pattern types than were identified when scoring the block could be identified and extracted as signature contact information in retrieval step 422. For example, block scoring to identify a selected block may use fewer or less detailed patterns than those applied in signature contact information in retrieval step 422. This may improve the processing speed of identifying probable signature data blocks, while at the same time allowing additional information to be retrieved once a selected block is targeted. For example, company name may be omitted as a pattern type when scoring blocks, but then used when retrieving signature contact information from a selected block.

In example embodiments, in step 422, the SDR system 270 is configured to send the retrieved signature contact information together with its source email identifying metadata to CRM support system 258 for storage in a signature contact information dataset of relationship intelligence database 260. In example embodiments, the SDR system 270 would gather multiple sets of signature contact information before forwarding them as a package to SDR system 270.

In some example embodiments the CRM support system 258 is configured to perform further processing on the signature contact information it receives from SDR system 270. For example, the CRM support system 258 may be configured to determine, based on the information stored in the signature contact information dataset of relationship intelligence database 260, if the signature contact information is information for a new contact, or includes new or additional information that updates existing signature contact information. If so, the CRM support system 258 can update the signature contact information dataset of relationship intelligence database 260, and furthermore, as indicated in step 440, CRM support system 258 can send the new or updated signature contact information to a CRM system 240 (for example, the CRM system of a client). This information may be sent as it is identified, as a larger package, or after a configurable period of time. CRM support system 258 can place the signature contact information in a format appropriate for CRM system 240.

In some example embodiments, SDR system 270 may be configured to provide the signature contact information and source email identifying metadata directly to CRM system 240.

Referring again to FIG. 4, step 410, as noted above, if the SDR system 270 determines that an email is part of a multi-email thread, it performs a multi-email thread SDR process as represented by steps 424 to 434, which will now be described with reference to FIG. 4 and example multi-thread email message body 700 shown in FIG. 7.

As noted above, in example embodiments, an email that incorporates a thread of prior emails is processed by dethreading/unwinding the body content into discrete fragments that each correspond to a respective email in the email thread, and applying block processing to the body content corresponding to each of the fragments. In example embodiments, the block processing may retrieve signature contact information for each discrete email message in an email thread, resulting in multiple sets of signature contact information that can be submitted for integration into a CRM database.

In this regard, as indicated by step 424, the SDR system 270 is configured to search the email message body for the complex patterns used to delineate email fragments as noted above in respect of step 408. Referring to the example of email message body 700 in FIG. 7, the pattern indicated by 702 is detected by SDR system 270 as delineating a fragment 706 of message body 700 that corresponds to an earlier email in the multi-thread email, and fragment 706 that corresponds to email content that corresponds to the latest email in the multi-thread email. Although only two fragments are shown in the example of FIG. 7, the email could include more than 2 fragments, each of which corresponds to content from a discrete email in the email chain.

As indicated in step 426, the SDR system 270 separates the email chain into the constituent email fragments (e.g., fragments 704 and 706 in the example of FIG. 7) for independent block processing. As indicated in step 428, SDR system 270 will select the next unprocessed email fragment then perform block processing, as indicated by Steps 412 through Step 420 (which operate the same as described above) for each fragment. As indicated by step 430, the signature contact information from the highest scoring block within the fragment is stored and SDR system 270 stores the signature contact information for the email fragment. In the example of FIG. 7, the retrieved signature contact information for fragment 704 is: Name: Jacob MacKay; Title: Maintenance and Equipment manager; Phone: 902-555-6767 ext. 2185; email address: jmackay@home.com.

As indicated in step 432, the SDR system 270 will determine if there are additional email fragments from the initial email thread. If there is, then the system will return to Step 428 to process the next email fragment. In the example of FIG. 7, the next fragment in the email thread is fragment 706, and the signature contact information retrieved from fragment 706 is: Name: Phil A. Bucket; Title: Regional Sales Manager; Phone number: 506-555-1212 ext. 102; and email address: pbucket@home.com.

As indicated step 434, once all email fragments for a multi-thread email have been processed, the SDR system 270 is configured to then send all of the signature contact information for each contact, together with metadata indicating the source email, to CRM support system 258 for storage in signature contact information dataset of relationship intelligence database 260. In example embodiments, the SDR system 270 would gather signature contact information from multiple emails before forwarding them as a package to SDR system 270. The CRM support system 258 then processes the information in the same manner as discussed above in respect of step 440.

In at least some examples, the SDR process described above enables signature data from multiple emails arriving at an enterprise mail server to be automatically retrieved without human interventions. This can increase the retrieval rate compared to other methods, thereby improving the efficiency of the Client network, CRM system and CRM support system as whole. The amount of human interaction with the overall system can be reduced, which may in some examples reduce wear and tear on manual human interface elements and may improve overall accuracy and efficiency.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An automated computer implemented method for retrieving signature contact information from email messages, comprising:
    processing an email message body to identify groups of characters that match patterns from a set of predefined signature data patterns, wherein the predefined signature data patterns include different types of signature data patterns that each correspond to a respective type of contact information for individuals;

for each group of characters that is identified as matching one of the predefined signature data patterns:
(a) reviewing a respective block of the email message body that includes up to a defined number of characters or words preceding the group of characters and up to a defined number of characters or words following the group of characters to identify other groups of characters within the respective block that also match patterns from the set of predefined signature data patterns, and
(b) generating a block score for the respective block based on the groups of characters identified as matching patterns from the set of predefined signature data patterns;
selecting one of the blocks based on the block scores generated for the respective blocks; and
retrieving signature contact information from the selected block and storing the retrieved signature contact information.

2. The method of claim 1 generating the block score for the respective blocks is based on a diversity of the types of the predefined signature data patterns identified within the respective block.

3. The method of claim 2 wherein generating the block score for the respective blocks comprises reducing the block score if a threshold amount of predefined signature data patterns of a same type are identified within the respective block.

4. The method of claim 2 wherein generating the block score for the respective blocks comprises increasing the block score if a threshold amount of different types of the predefined signature data patterns are identified within the respective block.

5. The method of claim 2 wherein the types of the predefined signature data patterns include patterns corresponding to at least two of the following types of contact information: individual name, title, email address, telephone number, website address, and social media link.

6. The method of claim 1, comprising processing the email message body to identify characters that indicate that the email message body includes fragments that each correspond to a respective email in a multi-email thread, wherein steps of: selecting one of the blocks based on the block scores generated for the respective blocks, retrieving signature contact information from the selected block and storing the retrieved signature contact information, are performed for each of the fragments that correspond to a respective email.

7. The method of claim 1 wherein the email message body is retrieved from an email in a batch of emails received from an email server, and the method is repeated for each of the emails in the batch.

8. The method of claim 1 comprising sending the retrieved signature contact information to a customer relationship management support system.

9. The method of claim 8 comprising, at the customer relationship management support system, determining if the retrieved signature contact information corresponds to a new contact or includes updated information for an existing contact and if so sending updated contact information based on the retrieved signature contact information to a customer relationship management system.

10. The method of claim 9 wherein:
processing the email message body to identify groups of characters that match patterns from the set of predefined signature data patterns, reviewing the respective blocks to identify other groups of characters within the respective block that also match patterns from the set of predefined signature data patterns, generating the block scores, selecting one of the blocks, and retrieving signature contact information and storing the retrieved signature contact information, are all performed at a processing system that is within a client network together with a mail server from which an email message that includes the email message body is received; and
the customer relationship management support system and the customer relationship management system are each located outside of the client network.

11. A processing system for retrieving signature contact information from email messages, comprising:
a processor;
an interface operatively coupled to the processor for accessing email messages from a mail server;
a non-transitory storage operatively connected to the processor and storing executable instructions that when executed by the processor configure the processing system to:
access a plurality of emails that have been received by the mail server and that are addressed to different users;
for at least some of the plurality of emails:
automatically process the email message body of the email to identify groups of characters that match patterns from a set of predefined signature data patterns, wherein the predefined signature data patterns include different types of signature data patterns that each correspond to a respective type of contact information for individuals;
for each group of characters that is identified as matching one of the predefined signature data patterns:
(a) review a respective block of the email message body that includes up to a defined number of characters or words preceding the group of characters and up to a defined number of characters or words following the group of characters to identify other groups of characters within the respective block that also match patterns from the set of predefined signature data patterns, and
(b) generate a block score for the respective block based on the groups of characters identified as matching patterns from the set of predefined signature data patterns;
select one of the blocks based on the block scores generated for the respective blocks; and
retrieve signature contact information from the selected block and store the retrieved signature contact information.

12. The processing system of claim 11 wherein at least some of the set of predefined signature data patterns are stored on the storage, and generating the block score for the respective blocks is based on a diversity of types of the predefined signature data patterns identified within the respective block.

13. The processing system of claim 12 wherein the processing system is configured to generate the block score for the respective blocks by reducing the block score if a threshold amount of predefined signature data patterns of a same type are identified within the respective block.

14. The processing system of claim 12 wherein the processing system is configured to generate the block score for the respective blocks by increasing the block score if a threshold amount of different types of the predefined signature data patterns are identified within the respective block.

15. The processing system of claim 12 wherein the types of the predefined signature data patterns include patterns corresponding to at least two of the following types of contact information: individual name, title, email address, telephone number, website address and social media link.

16. The processing system of claim 11 wherein the processing system is configured to process the email message body to identify characters that indicate that the email message body includes fragments that each correspond to a respective email in a multi-email thread, and to: select one of the blocks based on the block scores generated for the respective blocks, retrieve signature contact information from the selected block and store the retrieved signature contact information, for each of the fragments that correspond to a respective email.

17. The processing system of claim 11 wherein the processing system is configured to send the signature contact information to a customer relationship management support system.

18. The processing system of claim 17 in combination with the customer relationship management support system, the customer relationship management support system being configured to determine if the retrieved signature contact information corresponds to a new contact or includes updated information for an existing contact and if so send updated contact information to a customer relationship management system.

19. The processing system of claim 18 wherein the processing system is located within a client network together with the mail server, and the customer relationship management support system and the customer relationship management system are each located outside of the client network.

20. A computer program product comprising a non-transitory computer readable medium storing instructions that when executed by a processor of a processing system configure the processing system to:

access a plurality of emails that have been received by a mail server and that are addressed to different users;

for at least some of the plurality of emails:

automatically process the email message body of the email to identify groups of characters that match patterns from a set of predefined signature data patterns, wherein the predefined signature data patterns include different types of signature data patterns that each correspond to a respective type of contact information for individuals;

for each group of characters that is identified as matching one of the predefined signature data patterns:

(a) review a respective block of the email message body that includes up to a defined number of characters or words preceding the group of characters and up to a defined number of characters or words following the group of characters to identify other groups of characters within the respective block that also match patterns from the set of predefined signature data patterns, and (b) generate a block score for the respective block based on the groups of characters identified as matching patterns from the set of predefined signature data patterns;

select one of the blocks based on the block scores generated for the respective blocks; and retrieve signature contact information from the selected block and store the retrieved signature contact information.

\* \* \* \* \*